United States Patent
Wewers

(10) Patent No.: US 10,859,471 B2
(45) Date of Patent: Dec. 8, 2020

(54) SYNCHRONIZATION OF MACHINE VIBRATION DATA AFTER COLLECTION

(71) Applicant: epro GmbH, Gronau (DE)

(72) Inventor: Thomas Wewers, Gronau (DE)

(*) Notice: Subject to any disclaimer, the term of this patent is extended or adjusted under 35 U.S.C. 154(b) by 203 days.

(21) Appl. No.: 15/283,729

(22) Filed: Oct. 3, 2016

(65) Prior Publication Data

US 2018/0095010 A1     Apr. 5, 2018

(51) Int. Cl.
| | | |
|---|---|---|
| G01P 3/481 | (2006.01) |
| G01H 1/00 | (2006.01) |
| G01H 17/00 | (2006.01) |
| G06F 5/01 | (2006.01) |
| G01M 99/00 | (2011.01) |
| G01P 3/44 | (2006.01) |

(52) U.S. Cl.
CPC .......... G01M 99/008 (2013.01); G01H 1/003 (2013.01); G01H 17/00 (2013.01); G01P 3/44 (2013.01); G01P 3/481 (2013.01); G06F 5/01 (2013.01)

(58) Field of Classification Search
CPC ..... G01M 99/008; G01H 1/003; G01H 17/00; G01P 3/44; G01P 3/481
USPC .......................................................... 702/89
See application file for complete search history.

(56) References Cited

U.S. PATENT DOCUMENTS

| | | | | |
|---|---|---|---|---|
| 4,031,466 A * | 6/1977 | Krause | ................... | G01P 3/489 |
| | | | | 324/175 |
| 4,434,470 A * | 2/1984 | Thomas | ................. | G01R 23/10 |
| | | | | 324/166 |
| 4,578,755 A * | 3/1986 | Quinn | ..................... | G01P 3/489 |
| | | | | 324/391 |
| 4,870,665 A * | 9/1989 | Vaughn | .................... | H03K 5/05 |
| | | | | 327/114 |
| 4,881,040 A * | 11/1989 | Vaughn | .................... | H03K 3/78 |
| | | | | 327/160 |
| 4,885,707 A * | 12/1989 | Nichol | ................... | G01H 1/003 |
| | | | | 702/56 |
| 7,099,782 B2 * | 8/2006 | Hitchcock | ............. | G01H 1/003 |
| | | | | 702/56 |
| 7,391,835 B1 * | 6/2008 | Gross | .................. | G06F 11/2294 |
| | | | | 375/354 |
| 7,398,163 B2 * | 7/2008 | Tsukamoto | ........... | G01N 11/16 |
| | | | | 331/116 R |
| 7,478,256 B2 * | 1/2009 | Conway | ............ | G01R 31/3016 |
| | | | | 326/93 |

(Continued)

FOREIGN PATENT DOCUMENTS

JP            S5222430 A   *   2/1977   ............... G06F 3/06

*Primary Examiner* — Alexander Satanovsky
*Assistant Examiner* — Douglas Kay

(57) ABSTRACT

A machine data collection system uses tachometer timing information to perform post-collection synchronization of measurement data that was collected asynchronously using multiple sensors. In machine predictive analysis systems, timing information derived from a tachometer signal is typically used to make measurement calculations per rotation. A tachometer key signal that is detected by an event-triggered digital input can also be used to post-synchronize measurement data. Although a timestamp is not accurate enough alone for post-collection synchronization, the combination of a tachometer key signal and a timestamp can be accurate enough for post-collection synchronization.

5 Claims, 6 Drawing Sheets

(56) References Cited

U.S. PATENT DOCUMENTS

| | | | |
|---|---|---|---|
| 7,801,258 B2* | 9/2010 | Narus | G01R 31/31726 |
| | | | 375/356 |
| 7,899,633 B2* | 3/2011 | Tsukamoto | G01N 11/16 |
| | | | 331/116 R |
| 8,340,791 B2* | 12/2012 | Schulte | G01F 15/00 |
| | | | 324/76.11 |
| 2004/0199348 A1* | 10/2004 | Hitchcock | G01H 1/003 |
| | | | 702/92 |
| 2007/0174647 A1* | 7/2007 | Conway | G01R 31/3016 |
| | | | 713/500 |
| 2009/0022089 A1* | 1/2009 | Rudrapatna | H04B 7/0671 |
| | | | 370/328 |
| 2010/0305864 A1* | 12/2010 | Gies | E21B 47/01 |
| | | | 702/9 |
| 2012/0078464 A1* | 3/2012 | You | G01M 99/008 |
| | | | 701/32.8 |
| 2013/0018620 A1* | 1/2013 | Riendeau | G01M 5/00 |
| | | | 702/89 |
| 2015/0046111 A1* | 2/2015 | Chen | G01B 9/02002 |
| | | | 702/89 |
| 2015/0218929 A1* | 8/2015 | Narasimhan | E21B 45/00 |
| | | | 175/45 |
| 2016/0146646 A1* | 5/2016 | Willis | G01D 21/00 |
| | | | 702/89 |

\* cited by examiner

SYNCHRONIZATION OF MACHINE VIBRATION DATA AFTER COLLECTION

FIELD

This invention relates to the field of machine data collection. More particularly, this invention relates to a system for time synchronizing data from multiple data collection sensors subsequent to the collection of the data.

BACKGROUND

For meaningful analysis of data collected in machine monitoring systems, the data collected from multiple sensors should be as synchronous as possible. In some special machine performance prediction systems, the data is synchronized at the time of acquisition. In other systems that acquire data asynchronously, the data must be synchronized after the data has been collected and stored. Although a timestamp can be used to some extent for post-collection synchronization, the accuracy of timestamps is typically not good enough for the precise synchronization needed for some analysis applications.

What is needed, therefore, is a system for precise post-collection synchronization of machine data from multiple sensors prior to analysis.

SUMMARY

The above and other needs are met by a system that uses tachometer timing information to perform post-collection synchronization of measurement data that was collected asynchronously using multiple sensors. In machine predictive analysis systems, timing information derived from a tachometer signal (also referred to herein as a "key signal") is typically used to make measurement calculations per rotation. According to embodiments of the present invention, a key signal that is detected by an event-triggered digital input can also be used to post-synchronize measurement data. Although a timestamp is not accurate enough alone for post-collection synchronization, the combination of a key signal and a timestamp can be accurate enough for post-collection synchronization using the system described herein.

A preferred embodiment of the system implements a method for time synchronizing data from multiple machine data collection sensors subsequent to collection of the data. The method includes:
  (a) collecting a first set of data indicative of performance of a machine using a first sensor attached to or disposed adjacent the machine;
  (b) collecting a second set of data indicative of performance of the machine using a second sensor attached to or disposed adjacent the machine;
  (c) generating a first set of timing pulses that are dependent on a rotational speed of a component of the machine using a third sensor attached to or disposed adjacent the machine to detect machine rotation, the first set of timing pulses being spaced apart in time at a first time interval;
  (d) generating a second set of timing pulses based on the first set of timing pulses, wherein the second set of timing pulses include timing pulses that are spaced apart in time at a second time interval;
  (e) generating a third set of data that includes the first set of data and the second set of timing pulses;
  (f) generating a fourth set of data that includes the second set of data and the second set of timing pulses;
  (g) determining an offset between a timing pulse in the third set of data and a corresponding timing pulse in the fourth set of data; and
  (h) shifting all data samples in the third set of data based on the offset to bring the third set of data into time alignment with the fourth set of data, or shifting in time all data samples in the fourth set of data based on the offset to bring the fourth set of data into time alignment with the third set of data.

In some embodiments, step (d) comprises generating the second set of timing pulses to include at least some of the first set of timing pulses, wherein the second set of timing pulses are interspersed with the first set of timing pulses.

In some embodiments, step (d) comprises generating the second set of timing pulses having pulse characteristics that are different from the first set of timing pulses.

In some embodiments, step (d) comprises generating the second set of timing pulses as wider than the first set of timing pulses.

In some embodiments, the second time interval is greater than the first time interval.

In some embodiments, step (d) comprises generating the second set of timing pulses to include one of the second set of timing pulses for each measurement interval in the first and second sets of data.

In some embodiments, step (g) comprises:
  identifying a data sample within the third set of data corresponding to a leading edge or a trailing edge of a timing pulse in the second set of timing pulses;
  identifying a data sample within the fourth set of data corresponding to a leading edge or a trailing edge of a timing pulse in the second set of timing pulses; and
  determining the offset based on a time spacing or sample difference between the identified data sample within the third set of data and the identified data sample within the fourth set of data.

In some embodiments, the first and second sensors are vibration sensors.

Some embodiments of the method include:
  (i) collecting additional sets of data indicative of performance of the machine using additional sensors attached to or disposed adjacent the machine;
  (j) for each of the additional sets of data, generating a set of data that includes the additional set of data and the second set of timing pulses;
  (k) for each of the additional sets of data, determining an offset between a timing pulse in the third set of data and a corresponding timing pulse in the additional set of data; and
  (l) in each of the additional sets of data, shifting all data samples based on the offset to bring the additional sets of data into time alignment with the third set of data.

In another aspect, embodiments of the invention provide an apparatus for time synchronizing data from multiple machine data collection sensors subsequent to collection of the data. The apparatus includes first and second sensors attached to or disposed adjacent a machine for collecting first and second sets of data, respectively, that are indicative of machine performance. A third sensor, which is attached to or disposed adjacent the machine, generates a first set of timing pulses that are dependent on a rotational speed of a component of the machine. The first set of timing pulses are spaced apart in time at a first time interval. The apparatus includes a first signal processing circuit that generates a second set of timing pulses based on the first set of timing pulses. The second set of timing pulses include timing pulses that are spaced apart in time at a second time interval. A second signal processing circuit generates a third set of data that includes the first set of data and the second set of timing pulses. The second signal processing circuit also generates a fourth set of data that includes the second set of data and the second set of timing pulses. The apparatus includes a data analysis computer that receives the third and fourth sets of data and executes software instructions that determine an offset between a timing pulse in the third set of data and a corresponding timing pulse in the fourth set of data. The data analysis computer also executes software instructions that shift all data samples in the third set of data based on the offset to bring the third set of data into time alignment with the fourth set of data. Alternatively, the data analysis computer executes software instructions that shift all data samples in the fourth set of data based on the offset to bring the fourth set of data into time alignment with the third set of data.

In some embodiments of the apparatus, the first signal processing circuit generates the second set of timing pulses to include at least some of the first set of timing pulses, and to include the second set of timing pulses interspersed with the first set of timing pulses.

In some embodiments of the apparatus, the first signal processing circuit generates the second set of timing pulses having pulse characteristics that are different from the first set of timing pulses.

In some embodiments of the apparatus, the first signal processing circuit generates the second set of timing pulses as wider than the first set of timing pulses.

In some embodiments of the apparatus, the second time interval is greater than the first time interval.

In some embodiments of the apparatus, the first signal processing circuit generates the second set of timing pulses to include one pulse of the second set of timing pulses for each measurement interval in the first and second sets of data.

In some embodiments of the apparatus, the data analysis computer executes software instructions that determine the offset between a timing pulse in the third set of data and a corresponding timing pulse in the fourth set of data by:
identifying a data sample within the third set of data corresponding to a leading edge or a trailing edge of a timing pulse in the second set of timing pulses;
identifying a data sample within the fourth set of data corresponding to a leading edge or a trailing edge of a timing pulse in the second set of timing pulses; and
determining the offset based on a time spacing or sample difference between the identified data sample within the third set of data and the identified data sample within the fourth set of data.

In some embodiments of the apparatus, the first and second sensors comprise vibration sensors.

Some embodiments of the apparatus include a plurality of additional sensors attached to or disposed adjacent the machine for collecting additional sets of data indicative of performance of the machine. For each of the additional sets of data, a plurality of additional signal processing circuits each generate a set of data that includes the additional set of data and the second set of timing pulses. For each of the additional sets of data, the data analysis computer executes software instructions that determine an offset between a timing pulse in the third set of data and a corresponding timing pulse in the additional set of data. The data analysis computer also executes software instructions that shift all data samples in each additional set of data based on the offset to bring the additional sets of data into time alignment with the third set of data.

In some embodiments of the apparatus, the first and second signal processing circuits comprise a single signal processing circuit.

In some embodiments of the apparatus, one or both of the first and second signal processing circuits comprise a data collection card.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
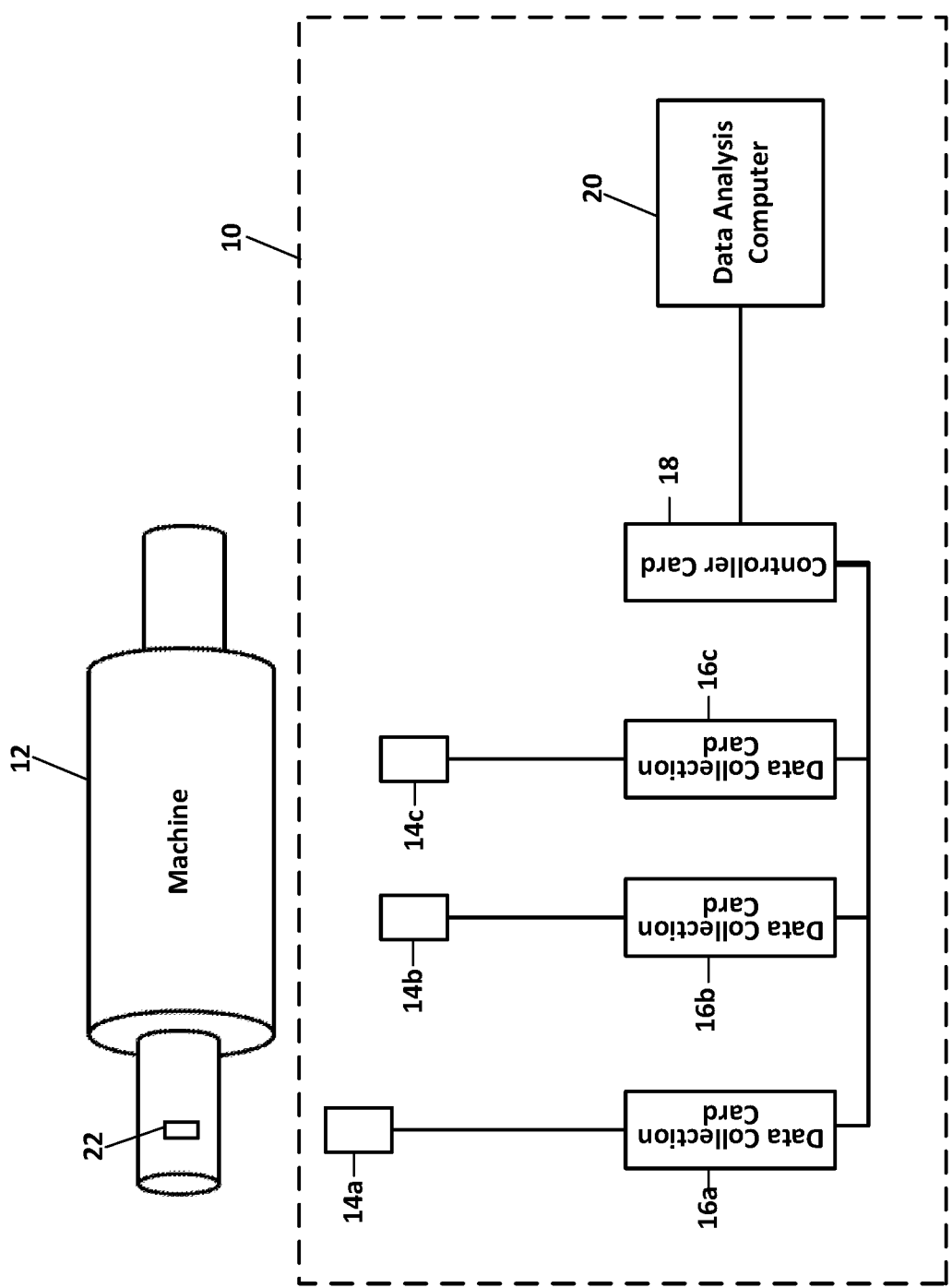
FIG. 1 depicts a machine data collection and analysis system according to an embodiment of the invention.
Figure 5:
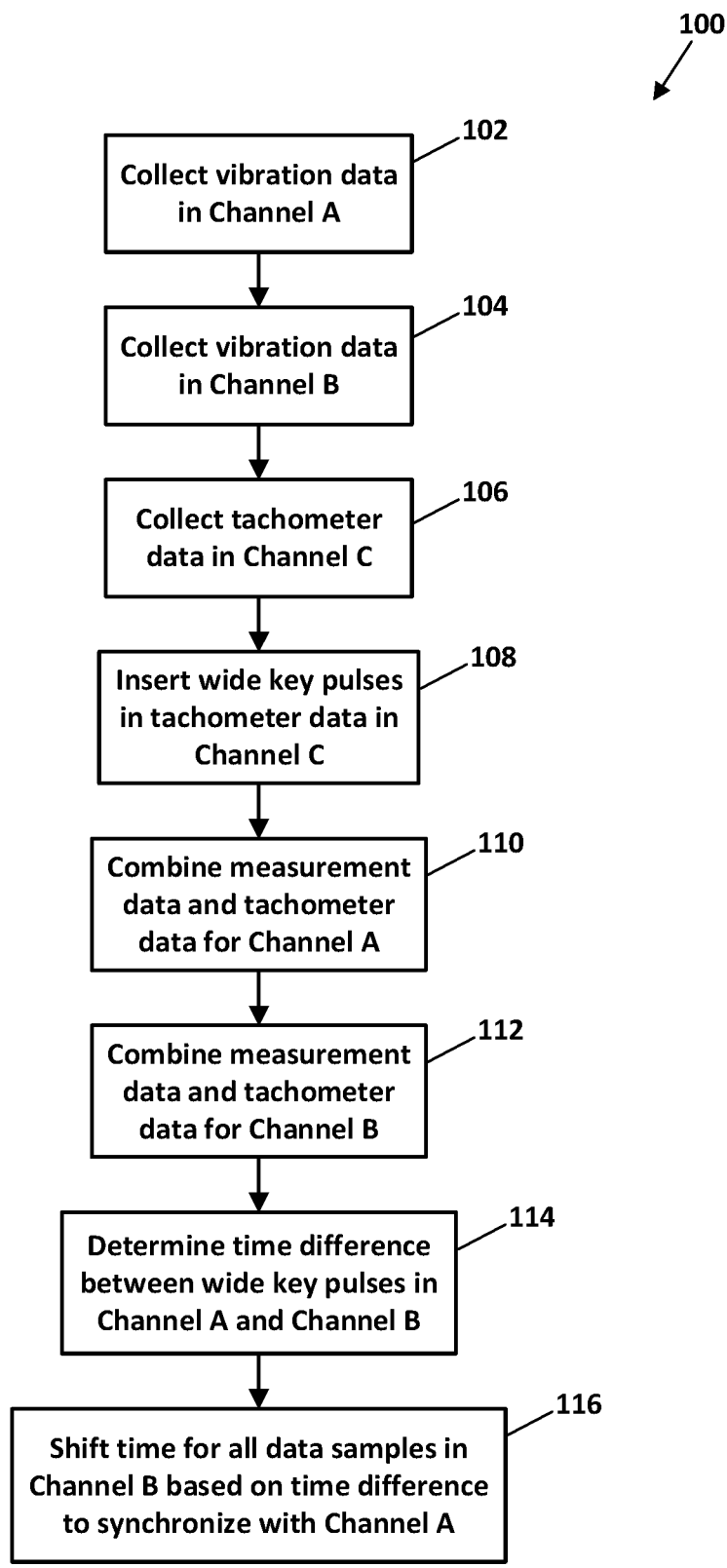
FIG. 5 depicts steps in a method for post-collection synchronization of machine measurement data according to an embodiment of the invention.

As shown in FIG. 1, a machine data collection and analysis system 10 includes multiple sensors 14a-14c for sensing information related to the operation of a machine 12, such as vibration and rotational speed. FIG. 5 depicts steps in an exemplary process 100 for synchronizing data collected using the system 10. The sensor 14a may be a tachometer that generates an analog tachometer signal based on detection of a key 22 on a rotating shaft of the machine 12. The analog tachometer signal is conditioned and sampled by a data collection card 16a that generates digital tachometer data based on the analog tachometer signal (step 106 in FIG. 5). For example, the data collection card 16a may be a CSI A6500-UM Universal Measurement Card as a component of a CSI 6500 ATG machinery protection system. The sensors 14b and 14c may be vibration sensors, such as piezoelectric sensors, that generate analog vibration signals indicative of vibration levels at different locations on the machine 12. It should be appreciated that the sensors 14b and 14c may comprise other types of sensors, such as temperature sensors, pressure sensors, voltage sensors, eddy current sensors or ultrasonic sensors. Thus, embodiments of the invention are not limited to vibration sensors.

Figure 2:
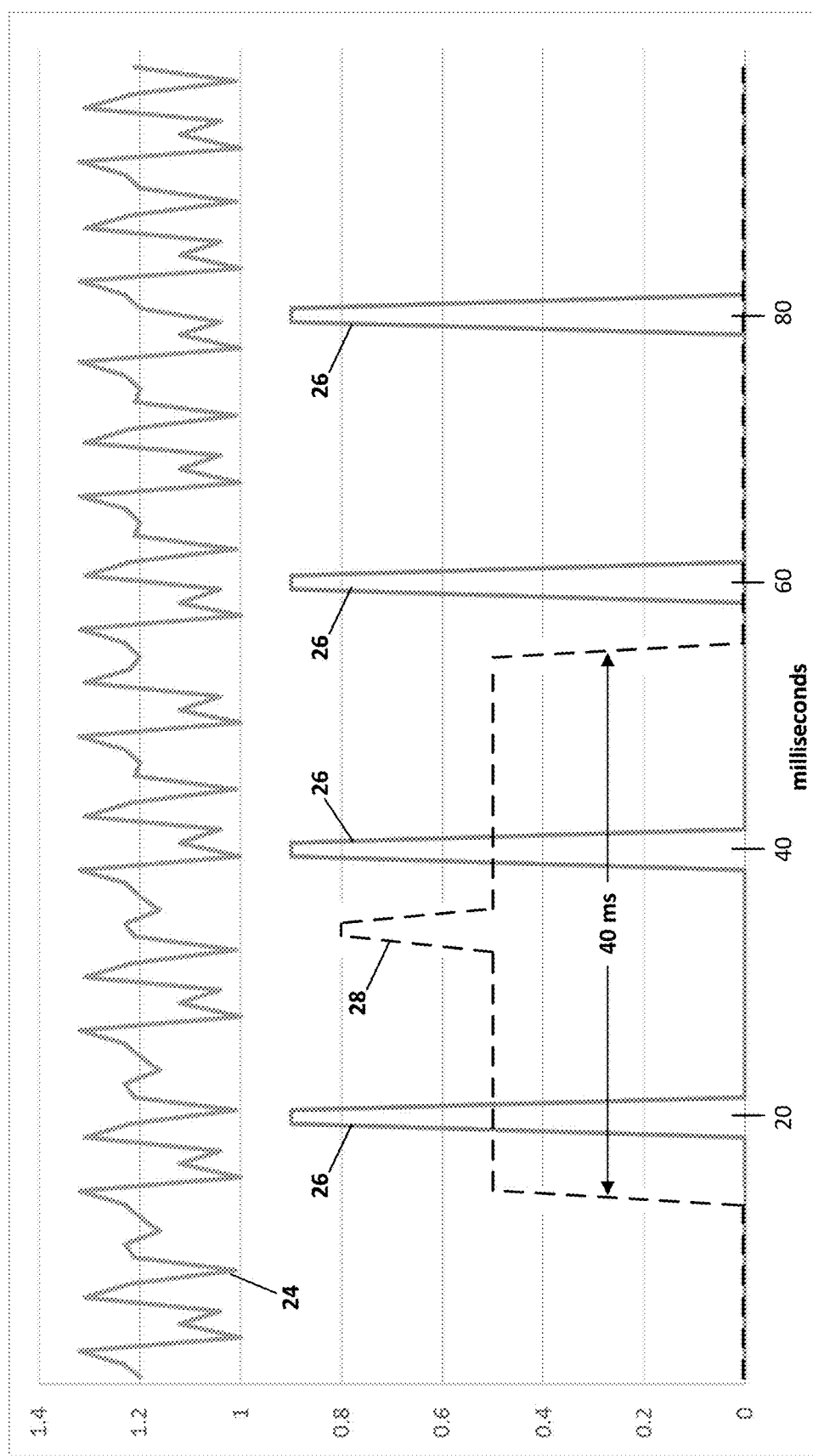
FIG. 2 depicts an exemplary machine data waveform with sensor signal, key signal and timestamp.

The analog vibration signals from the sensors 14b and 14c are conditioned and sampled by data collection cards 16b and 16c that generate digital vibration data based on the analog vibration signals (steps 102 and 104). The digital vibration data sets that are generated based on measurements from the sensors 14b and 14c are examples of a first set of data and a second set of data, which terms are also used herein to refer to machine data. The data collection cards 16a-16c are examples of signal processing circuits, which phrase is also used herein to refer to circuitry for conditioning signals and sampling data. Although the simplified example depicted in FIG. 1 includes a single tachometer signal channel and only two vibration signal channels, various embodiments of the system may include more than one tachometer channel and more than two vibration channels FIG. 2 depicts an example of a time waveform of a vibration signal 24, such as may be generated by either of the sensors 14b or 14c, and key signal pulses 26, such as may be generated by the tachometer 14a. The key signal pulses 26 are examples of a first set of timing pulses, which phrase is also used herein to refer to timing signals. In this example, the machine 12 is running at 3000 rev/min resulting in key signal pulses 26 that are generated at 20 millisecond intervals. The time interval separating the key signal pulses 26 is an example of a first fixed time interval, which phrase is also used herein to refer to a time separation between timing pulses.

In a preferred embodiment, each of the data collection cards 16a-16c generates timestamps that are embedded in each data block of the sensor data. For example, timestamp data may be embedded in the sensor data at 100 millisecond intervals. Each timestamp indicates a system-generated date and time at which the timestamp was embedded. The placement of the timestamp in the data may have an accuracy of ±10 milliseconds. Thus, when comparing data from two sensor channels, there may be an actual time difference of up to 40 milliseconds (±20) between two timestamps in the two channels that indicate exactly the same system-generated time. The wide portion of the timestamp 28 depicted in FIG. 2 represents this ±20 millisecond uncertainty. This indicates why use of timestamps alone to align data from multiple channels is not sufficiently accurate.

Figure 3:
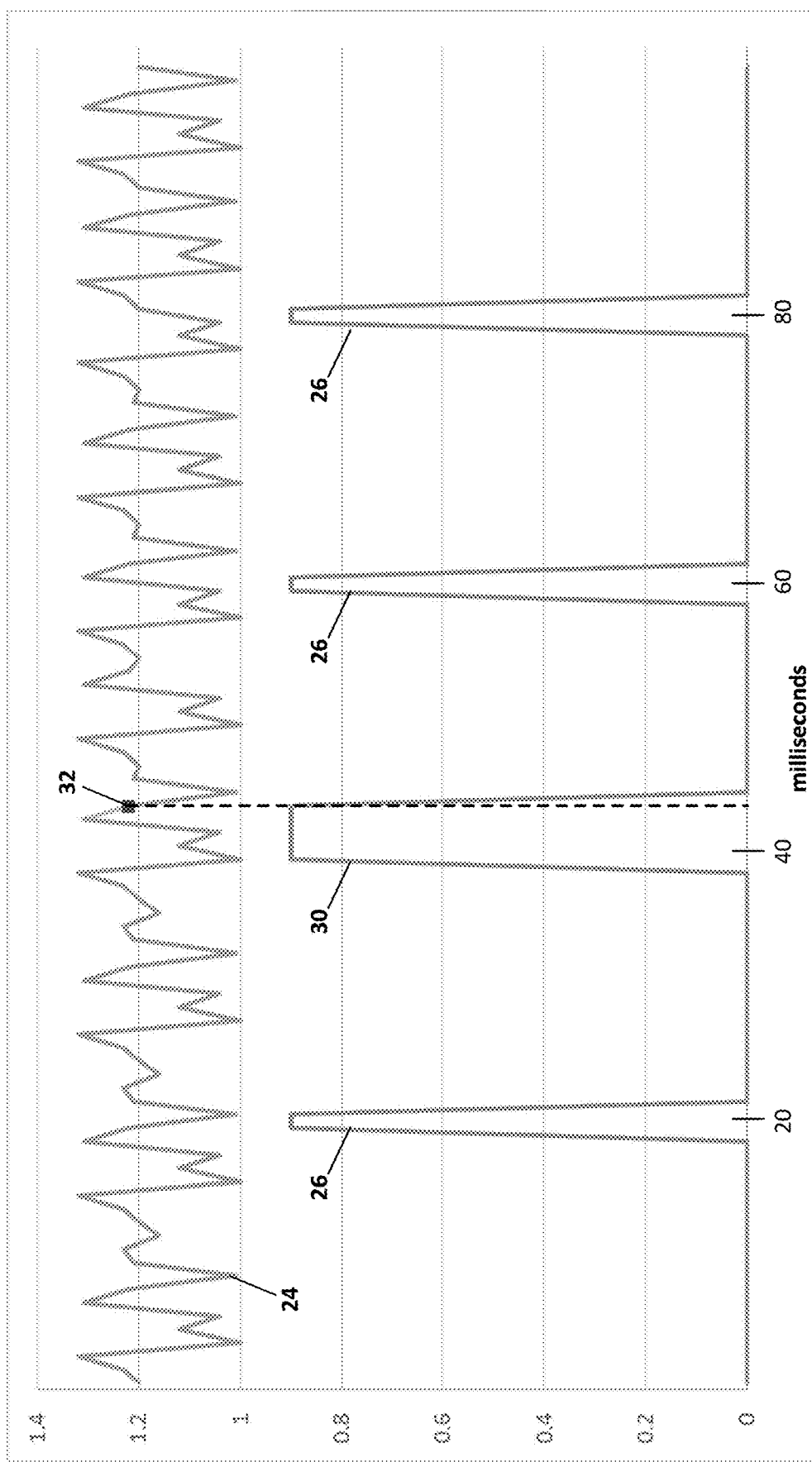
FIG. 3 depicts an exemplary machine data waveform with sensor signal and wide and narrow key signals according to an embodiment of the invention.

According to a preferred embodiment as depicted in FIG. 3, at predetermined intervals (i.e., one second intervals), the tachometer data collection card 16a synthesizes a key pulse 30 that is wider than the other key pulses 26 (step 108 in FIG. 5). The time interval separating the wide key pulses 30 is an example of a second fixed time interval, which phrase is also used herein to refer to a time separation between timing pulses. The rate at which a wide key pulse 30 is generated depends on the measurement time interval and the maximum speed of the machine 12. There should be one wide key pulse 30 within each measurement interval (data block) for proper data alignment. The wide key pulses 30 are an example of a second set of timing pulses, which phrase is also used herein to refer to a time separation between timing pulses. The wide key pulse 30 is detected by the data collection card 16a, and the wide key pulse 30, or a vibration data sample 32 aligned with the rising or falling edge of the wide key pulse 30, is stored with the vibration data for each measurement channel (steps 110 and 112). The data sets resulting from the combination of the vibration data from the two measurement channels with the timing pulses are examples of third and fourth sets of data, which phrases are also used herein to refer to data sets.

Figure 4:
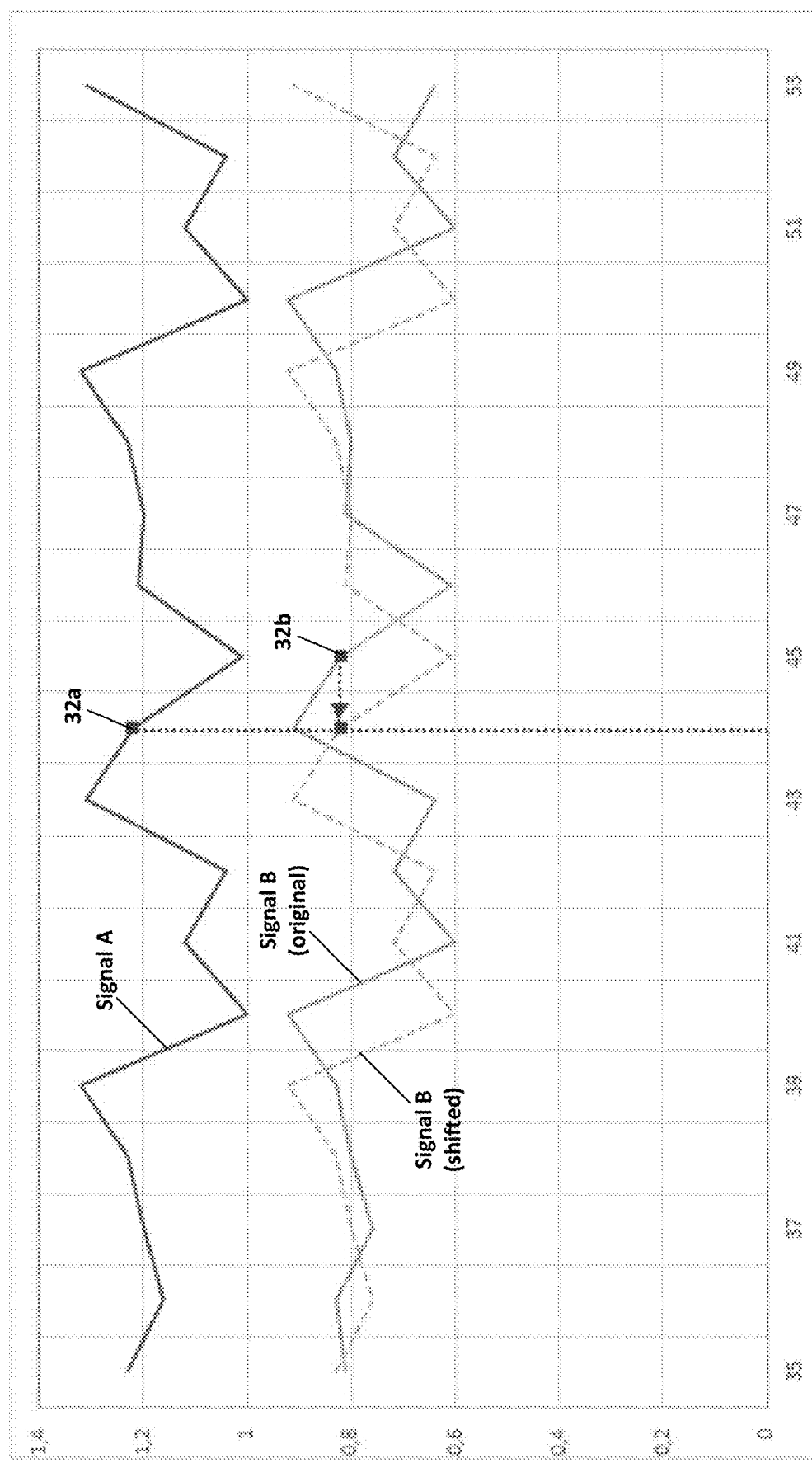
FIG. 4 depicts an exemplary machine data waveform with two asynchronous sensor signals, wherein one of the sensor signals is shifted according to an embodiment of the invention to make the signals synchronous.

In a post-collection process, data from two or more channels that were collected asynchronously may be synchronized using the wide key pulse 30 or using the data sample corresponding to the rising or falling edge of the wide key pulse 30. For example, as shown in FIG. 4, prior to the synchronization process, Signal A data and Signal B data are misaligned by the time difference of one data sample period. The time difference between the vibration data sample 32a and the vibration data sample 32b is determined (step 114), and based on this time difference, Signal B is shifted in time to be in alignment with Signal A (step 116). Alternatively, Signal A is shifted in time to be in alignment with Signal B. In a preferred embodiment, the shifting process is carried out by software executed on the data analysis computer 20.

In a preferred embodiment of the synchronization process, one of the measurement channels is used as the master channel, and the alignment in time for all other measurement channels referenced to the master channel. Thus, if channel A is selected as the master channel, the time of the data sample corresponding to the wide key pulse in channel B is set to match the time of the corresponding data sample in channel A. Accordingly, the data samples at all measurement points in channel B are shifted in the time domain according to the time difference between channel A and channel B. For this synchronization process to be effective, the sample frequency should be the same for all measurement channels.

Figure 6:
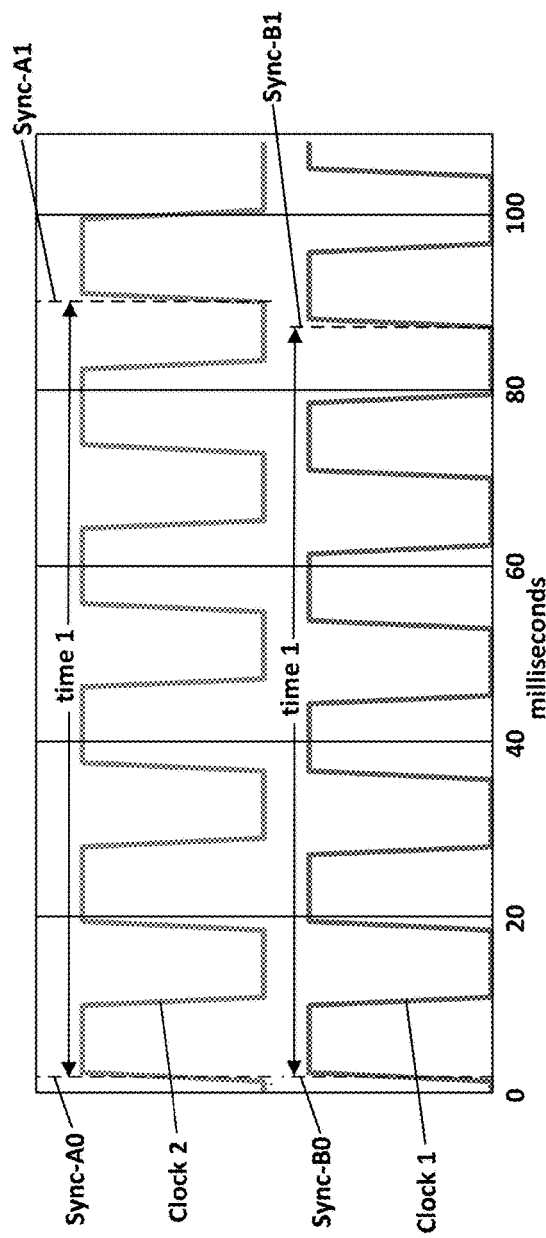
FIG. 6 depicts clock pulses of two asynchronous sensor signals, wherein one of the sensor signals is shifted according to an alternative embodiment of the invention to make the signals synchronous.
Figure 6:
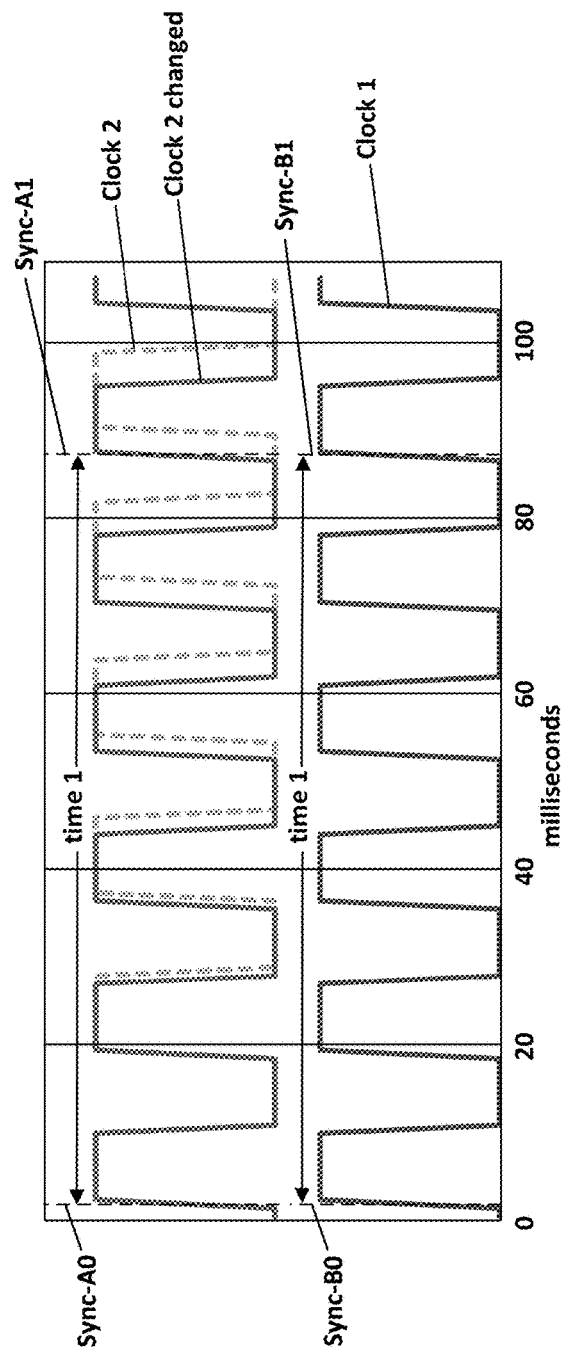

In some embodiments, clock variations can be eliminated by scaling of the tachometer signal in the time domain. If the tachometer signal includes two of the wide key pulses per data block, there are two reference points in time to accomplish such scaling. For example, as shown in FIG. 6, there are two reference points Sync-A0 and Sync-A1 in a data block for a signal A, and two reference points Sync-B0 and Sync-B1 in a data block for a signal B. Due to clock variations between measurement channels, the reference points Sync-A1 and Sync-B1 are misaligned. By rescaling (compressing) the time scale for signal A or rescaling (expanding) the time scale for signal B, reference points Sync-A1 and Sync-B1 can be brought into alignment.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for time synchronizing data from multiple machine data collection sensors, the method comprising:
   (a) collecting a first set of data indicative of performance of a machine using a first sensor attached to or disposed adjacent to the machine, the first set of data including first data samples and timestamps, wherein each timestamp indicates a date and time at which a corresponding data block of first data samples was collected;
   (b) collecting a second set of data indicative of performance of the machine using a second sensor attached to or disposed adjacent to the machine, the second set of data including second data samples and timestamps, wherein each timestamp indicates a date and time at which a corresponding data block of second data samples was collected;
   (c) generating first timing pulses that are dependent on a rotational speed of a component of the machine using a third sensor attached to or disposed adjacent to the machine to detect machine rotation, wherein the first timing pulses are spaced apart in time at a first time interval and have a first pulse width;

(d) generating second timing pulses that are dependent on the rotational speed of the component of the machine, coincide in time with selected ones of the first timing pulses, are spaced apart from each other at a second time interval that is greater than the first time interval, and have a second pulse width that is greater than the first pulse width;

(e) generating a third set of data as a time master by combining the first set of data with the second timing pulses;

(f) generating a fourth set of data by combining the second set of data with the second timing pulses, comprising:
  (f1) identifying one of the second timing pulses in the fourth set of data that is closest in time to one of the timestamps in the third set of data; and
  (f2) based on the second timing pulse identified in step (f1), shifting the timing of one or more data samples in the fourth set of data associated with the second timing pulse identified in step (f1) to the time indicated by the closest timestamp in the third set of data; and (g) shifting the timing of all other data samples in the fourth set of data by the same time shift applied to the one or more data samples in step (f2) to bring the fourth set of data into time alignment with the third set of data.

2. The method of claim 1 wherein the first and second sensors are vibration sensors.

3. The method of claim 1 further comprising:
  (h) collecting additional sets of data indicative of performance of the machine using additional sensors attached to or disposed adjacent the machine;
  (i) for each of the additional sets of data, generating a set of data that includes the additional set of data and the second timing pulses; and
  (j) in each of the sets of data generated in step (i), shifting the timing of the data samples to bring the additional sets of data into time alignment with the third set of data.

4. The method of claim 1 wherein shifting the timing of all other data samples in step (g) comprises:
  applying a constant time shift to the data samples, or
  rescaling time intervals between the data samples by compression or expansion.

5. The method of claim 1 wherein the first timestamps are embedded in the first set of data as the first set of data is collected, and the second timestamps are embedded in the second set of data as the second set of data is collected.

* * * * *